2,883,374
METAL CONTAINING MONOAZO DYESTUFFS

Edgar Enders, Leverkusen-Bayerwerk, Germany, assignor to Farbenfabriken Bayer Aktiengesellschaft, Leverkusen, Germany, a corporation of Germany No Drawing. Application July 31, 1956
Serial No. 601,119

Claims priority, application Germany August 16, 1955

5 Claims. (Cl. 260—146)

The present invention relates to metal containing monoazo dyestuffs and to a process for their manufacture; more particularly it relates to the metal complexes of monoazo dyestuffs being free of sulfonic and carboxylic acid groups and corresponding to the general formula

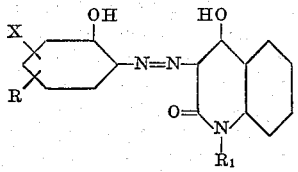

wherein X means hydrogen or a non-ionic substituent, R stands for an alkylsulfone or sulfonamide radical and $R_1$ means a —$CH_2CH_2CH_2$— radical linked to the 8-position of the carboxylic nucleus or $R_1$ stands for an alkyl-, aralkyl- or aryl-radical.

It is an object of the invention to provide new metal containing monoazo dyestuffs with good fastness properties.

Monoazo dyestuffs of the above general formula are obtainable by coupling diazotized 1-amino-2-hydroxy-benzenes containing in the nucleus an alkyl-sulfone or an sulfonamide group which may be substituted and the nucleus, if desired, being substituted by a further non-ionic substituent, with 1,8-trimethylene-4-hydroxycarbostyril or with N-alkyl-, aralkyl- or aryl-4-hydroxy-2-quinolones.

Examples of suitable 1-amino-2-hydroxybenzenes are 1-amino-2-hydroxybenzene-5-sulfonic acid amide, 1-amino-2-hydroxybenzene-5-sulfonic acid methylamide, 1-amino-2-hydroxybenzene-5-sulfonic acid dimethylamide, 1-amino-2-hydroxybenzene-5-sulfonic acid anilide, 1-amino - 2 - hydroxybenzene - 5-methylsulfone, 1-amino-2-hydroxybenzene-5-ethylsulfone, 1-amino-2-hydroxybenzene-4-sulfonic acid amide, 1-amino-2-hydroxybenzene-4-sulfonic acid dimethylamide, 1-amino-2-hydroxybenzene-4-sulfonic acid anilide, 1-amino-2-hydroxybenzene-4-methylsulfone, 1 - amino - 2-hydroxy-5-chlorobenzene-4-sulfonic acid amide, 1 - amino - 2-hydroxy-5-methylbenzene-4-sulfonic acid amide, 1-amino-2-hydroxy-3-nitrobenzene-5-sulfonic acid amide.

1,8-trimethylene-4-hydroxy-carbostyril used as coupling component may readily be obtained by heating tetrahydro-quinoline with malonic acid ester (cf. Kayser and Reissert, Berichte der Deutschen Chemischen Gesellschaft 25, 1193).

As coupling components there may be further used for example N-methyl-4-hydroxy-2-quinolone, N-ethyl-4-hydroxy - 2 - quinolone, N-butyl-4-hydroxy-2-quinolone, N-benzyl - 4 - hydroxy - 2-quinolone, N-phenyl-4-hydroxy-2-quinolone.

The N-alkyl-, N-aralkyl- or N-aryl-4-hydroxy-2-quinolones may be prepared, for example, according to the instructions of German patent specification No. 287,803 from the correspondingly substituted anthranilic acids.

The metallisation of the monoazo dyestuffs may be carried out by conventional processes, for instance, by the action of chromium complexes of salicyclic acid, oxalic acid or tartaric acid, by the reaction with alkali metal chromates in the presence of reducing agents, by heating with trivalent chromium salts in organic solvents or by the action of ammoniacal solutions of cobalt salts.

The metallisation may also be effected in mixture with known o,o'-dihydroxyazo dyestuffs free from sulfonic acid groups or with o-hydroxy-o'-aminoazo dyestuffs.

Metal-free dyestuffs of the said kind which exhibit a sufficient water-solubility, may be converted on the fibre, for instance by the single bath chroming process, into their metal complex compounds.

The preferred azo dyestuffs are, however, those metallised in substance which dye wool or materials of similar dyeing properties from a neutral to weakly acid bath in preponderantly red to reddish-brown shades. The dyeings on wool thus obtained are distinguished by their good levelling properties as well as by a very good fastness to washing, milling, decatizing and carbonizing and by an excellent fastness to light.

The following examples are given for the purpose of illustrating the invention without, however, limiting it thereto. The parts by weight and the parts by volume stand in the ratio of grams to millilitres.

Example 1

11.0 parts by weight of 1-amino-2-hydroxy-benzene-5-sulfonic acid amide are stirred with 200 parts by volume of water and 12 parts by volume of concentrated hydrochloric acid and diazotized with an aqueous solution of 4.3 parts by weight of sodium nitrite. The suspension of the diazo compound is added with stirring to a solution of 11.7 parts by weight of 1,8-trimethylene-4-hydroxy-carbostyril in 100 parts by volume of a 15 percent soda solution, 15 parts by weight of a 40 percent sodium hydroxide solution and 150 parts by weight of ice. After the coupling is completed, the mixture is heated to 70–80° C. and the dyestuff is separated by addition of dilute acetic acid and filtered off. It corresponds to the formula

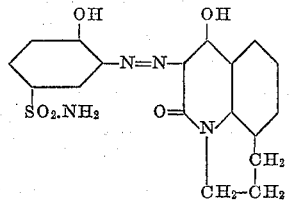

The dyestuff paste thus obtained is dissolved in 500 parts by volume of water with addition of dilute sodium hydroxide and stirred with an ammoniacal solution of 8.7 parts by weight of crystalline cobalt sulfate at 70–80° C. After the metallisation is terminated, the dyestuff is separated by the addition of common salt, pressed and dried. It is a brown powder which readily dissolves in water with a brown coloration and dyes wool from a neutral bath in level orange-brown shades of very good wet and light fastness.

For the preparation of the chromium complex, the paste of the metal-free dyestuff is dissolved with addition of dilute sodium hydroxide in 300 parts by volume of water and heated under reflux with 200 parts by volume of an alkaline solution of chromium salicylic acid, corresponding to 2.5 parts by weight of chromium oxide, until the metallisation is terminated. The separated and dried dyestuff is a reddish brown powder which readily dissolves in water with a bluish red coloration and dyes wool from a neutral bath in level reddish bordo shades of very good fastness to wetting and light.

Example 2

13 parts by weight of 1-amino-2-hydroxy-5-chlorobenzene-4-sulfonic acid amide are stirred with 250 parts by volume of water and 12 parts by volume of concentrated hydrochloric acid and diazotized with an aqueous solution of 4.3 parts by weight of sodium nitrite. The suspension of the diazo compound is added with stirring to a solution of 11.7 parts by weight of 1,8-trimethylene-4-hydroxy-carbostyril in 100 parts by volume of a 15 percent soda solution, 15 parts by volume of 40 percent sodium hydroxide and 150 parts by weight of ice. After the coupling is completed, the mixture is heated to 70–80° C. and the dyestuff is separated by the addition of dilute hydrochloric acid and filtered off. It corresponds to the formula

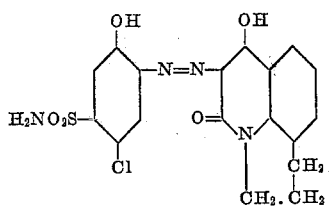

The dyestuff paste thus obtained is dissolved in 500 parts by volume of water with addition of dilute sodium hydroxide and stirring with an ammoniacal solution of 8.5 parts by weight of crystalline cobalt sulfate at 70–80° C. After the metallisation is terminated, the dyestuff is separated by the addition of common salt, squeezed off and dried. It is a reddish brown powder which readily dissolves in water with a bluish red coloration and dyes wool from a neutral bath in level bluish red shades of very good wet and light fastness.

For the preparation of the chromium complex, the paste of the metal-free dyestuff is dissolved with the addition of dilute sodium hydroxide in 500 parts by volume of water. While gently boiling the solution, a slightly alkaline solution of 6 parts by weight of sodium bichromate and 6.5 parts by weight of glucose in 150 parts by volume of water is added dropwise thereto. After the metallisation is completed, the dyestuff is isolated in conventional manner and dried. A brownish red powder is obtained which readily dissolves in water with a bluish red coloration and dyes wool from a neutral bath in level bordo shades of very good wet and light fastness.

In a similar manner the dyestuffs listed in the following table may be obtained.

| | Diazo component | Coupling Component | Metal | Dyeing of the metal complex on wool |
|---|---|---|---|---|
| 3 | 1-amino-2-hydroxy-benzene-4-sulfonic acid amide. | 1,8-trimethylene 4-hydroxy-carbostyril. | Co | brick red. |
| 4 | ___do___ | ___do___ | Cr | bluish red. |
| 5 | 1-amino-2-hydroxy-benzene-5-sulfonic acid dimethyl amide. | ___do___ | Cr | Do. |
| 6 | 1-amino-2-hydroxy-benzene-4-sulfonic acid dimethyl amide. | ___do___ | Co | brick red. |
| 7 | ___do___ | ___do___ | Cr | reddish claret. |
| 8 | 1-amino-2-hydroxy-benzene-4-sulfonic acid anilide. | ___do___ | Co | brick red. |
| 9 | ___do___ | ___do___ | Cr | reddish claret. |
| 10 | 1-amino-2-hydroxy-benzene-5-methyl-sulfone. | ___do___ | Co | orange-brown. |
| 11 | ___do___ | ___do___ | Cr | bluish red. |
| 12 | 1-amino-2-hydroxy-benzene-4-methyl-sulfone. | ___do___ | Co | brick red. |
| 13 | 1-amino-2-hydroxy-benzene-5-ethyl-sulfone. | ___do___ | Co | orange brown. |
| 14 | ___do___ | ___do___ | Cr | bluish red. |
| 15 | 1-amino-2-hydroxy-benzene-5-n-propyl-sulfone. | ___do___ | Cr | Do. |

Example 16

11.0 parts by weight of 1-amino-2-hydroxybenzene-5-sulfonic acid amide are mixed with stirring with 200 parts by volume of water and 12 parts by volume of concentrated hydrochloric acid and diazotized with an aqueous solution of 4.3 parts by weight of sodium nitrite. The suspension of the diazo compound is added at 5–10° C. to a solution of 12.5 parts by weight of N-butyl-4-hydroxy-2-quinolone in 200 parts by volume of water, 10 parts by volume of a 15 percent sodium carbonate solution. After the coupling is completed, the mixture is heated to 70–80° C., the dyestuff is separated out by addition of dilute acetic acid and filtered off. It corresponds to the formula

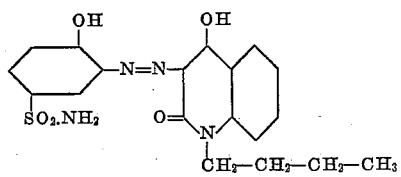

The dyestuff paste thus obtained is dissolved in 500 parts by volume of water with the addition of dilute sodium hydroxide and treated at 80° C. with an ammoniacal solution of 8.5 parts by weight of crystalline cobalt sulfate. After the metallisation is complete, the dyestuff is separated out by the addition of common salt, pressed and dried. It is a brown powder which readily dissolves in water with a red-brown coloration and dyes wool from a neutral bath in level orange-brown shades of very good wet and light fastness.

For the preparation of the corresponding chromium complex, the solution of the metal-free dyestuff is treated slowly at 95–100° C. with a weakly alkaline solution of 5 parts by weight of sodium bichromate and 6 parts by weight of glucose in 50 parts by volume of water and worked up in usual manner after the metallisation is completed. A brown powder is obtained which readily dissolves in water with a red coloration and dyes wool from a neutral bath in level bluish red shades of very good wet and light fastness.

Dyestuffs having similar properties are obtained by replacing the diazo component by an appropriate quantity of 1-amino-2-hydroxybenzene-5-sulfonic acid methylamide, 1-amino-2-hydroxybenzene-5-sulfonic acid anilide or 1-amino-2-hydroxybenzene-5-sulfonic acid benzylamide, or by replacing the coupling component by an appropriate amount of N-methyl-4-hydroxy-2-quinolone.

Example 17

12.9 parts by weight of 1-amino-2-hydroxy-5-chlorobenzene-4-sulfonic acid amide are stirred with 250 parts by volume of water and 12 parts by volume of concentrated hydrochloric acid and diazotized with an aqueous solution of 4.3 parts by weight of sodium nitrite. The suspension of the diazo compound is combined with a solution of 12.5 parts by weight of N-butyl-4-hydroxy-2-quinolone in 200 parts by volume of water, 10 parts by volume of a 40 percent sodium hydroxide solution and 100 parts by volume of 15 percent sodium carbonate solution. After the coupling is completed, the mixture is heated to 70–80° C., the dyestuff is separated by the addition of dilute hydrochloric acid, filtered off and dried. It corresponds to the formula:

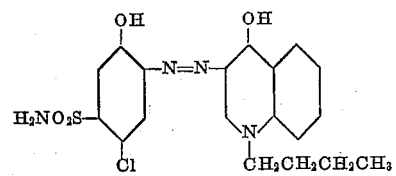

The dyestuff paste thus obtained is dissolved in 500 parts by volume of water with addition of dilute sodium hydroxide, and treated with an ammoniacal solution of 8.5 parts by weight of crystalline cobalt sulfate at 80° C. The metallisation is completed after a short time. The dyestuff is separated by the addition of common salt, filtered off and dried. A brown powder is obtained which dissolves in water with a red coloration and dyes wool from a neutral bath in level bluish red shades of very good wet fastness and excellent fastness to light.

The chromium complex of the same dyestuff dyes wool in reddish claret shades having likewise good fastness properties.

*Example 18*

11.0 parts by weight of 1-amino-2-hydroxybenzene-5-sulfonic acid amide are diazotized in conventional manner and combined with a solution of 6.2 parts by weight of N-butyl-4-hydroxy-2-quinolone and 5.8 parts by weight of 1-acetylamino-7-hydroxynaphthalene in 300 parts by volume of water, 12 parts by volume of a 40 percent sodium hydroxide solution and 100 parts by volume of a 15 percent sodium carbonate solution. After the coupling is completed, the mixture is heated to 70-80° C., and the dyestuff mixture is separated by the addition of dilute hydrochloric acid and then filtered off. The paste thus obtained is dissolved in 500 parts by volume of hot water with addition of dilute sodium hydroxide and treated at 80° C. with an ammoniacal solution of 8.5 parts by weight of crystalline cobalt sulfate. The metal-containing dyestuff mixture is separated out by the addition of common salt, filtered off and dried. A brown powder is obtained which readily dissolves in water with a brown coloration and dyes wool from a neutral bath in intensely reddish brown shades of very good wet and light fastness.

The corresponding mixed chromium complex dyes wool likewise in reddish brown shades.

In a similar manner dyestuffs are produced from the diazo compounds and coupling components listed in the following table.

| | Diazo component | Coupling component | Metal | Shade of the dyeing on wool |
|---|---|---|---|---|
| 19 | 1-amino-2-hydroxy-benzene-4-sulfonic acid amide. | N-butyl-4-hydroxy-2-quinolone. | Co | Brick-red. |
| 20 | ----do---- | ----do---- | Cr | Bluish-red. |
| 21 | 1-amino-2-hydroxy-benzene-4-sulfonic acid dimethylamide. | ----do---- | Cr | Do. |
| 22 | 1-amino-2-hydroxy-5-methylbenzene-4-sulfonic acid amide. | ----do---- | Co | Brick-red. |
| 23 | 1-amino-2-hydroxy-benzene-5-sulfonic acid-o-anisidide. | N-methyl-4-hydroxy-2-quinolone. | Co | Bluish-red. |
| 24 | 1-amino-2-hydroxy-benzene-5-methylsulfone. | N-butyl-4-hydroxy-2-quinolone. | Cr | Do. |
| 25 | 1-amino-2-hydroxy-benzene-5-sulfonic acid amide. | N-phenyl-4-hydroxy-2-quinolone. | Cr | Do. |
| 26 | 1-amino-2-hydroxy-benzene-5-ethylsulfone. | N-butyl-4-hydroxy-2-quinolone. | Cr | Do. |
| 27 | 1-amino-2-hydroxy-benzene-5-n-propylsulfone. | N-methyl-4-hydroxy-2-quinolone. | Cr | Do. |
| 28 | 1-amino-2-hydroxy-benzene-5-sulfonic acid methylamide. | N-ethyl-4-hydroxy-2-quinolone. | Cr | Do. |
| 29 | ----do---- | N-benzyl-4-hydroxy-2-quinolone. | Cr | Do. |

I claim:

1. A metal complex compound selected from the group consisting of cobalt complexes and chromium complexes, one mol of said metal being bound in complex union with 2 moles of dyestuffs corresponding to the formula:

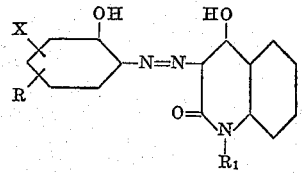

wherein X means a member selected from the group consisting of hydrogen and chlorine, R stands for a sulfonamide radical, and $R_1$ means a member selected from the group consisting of a $-CH_2-CH_2-CH_2-$ radical linked to the 8-position and a lower alkyl, benzyl and phenyl radical, the dyestuffs being free of sulfonic and carboxylic acid groups.

2. A metal complex compound selected from the group consisting of cobalt complexes and chromium complexes, one mol of said metal being bound in complex union with 2 mols of dyestuffs corresponding to the formula:

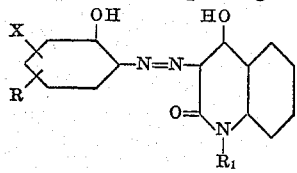

wherein X means a member selected from the group consisting of hydrogen and chlorine, R stands for a sulfonamide radical and $R_1$ means a lower alkyl radical, the dyestuffs being free of sulfonic and carboxylic acid groups.

3. A metal complex compound selected from the group consisting of cobalt complexes and chromium complexes, one mol of said metal being bound in complex union with 2 mols of dyestuffs corresponding to the formula:

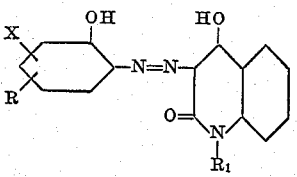

wherein X means a member selected from the group consisting of hydrogen and chlorine, R stands for a sulfonamide radical and $R_1$ means a phenyl radical, the dyestuffs being free of sulfonic and carboxylic acid groups.

4. The cobalt complex of the monoazo dyestuff corresponding to the formula

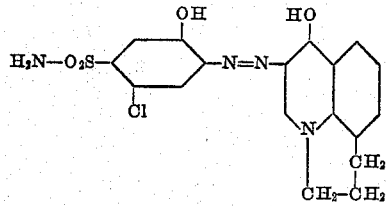

5. The cobalt complex of the monoazo dyestuff corresponding to the formula

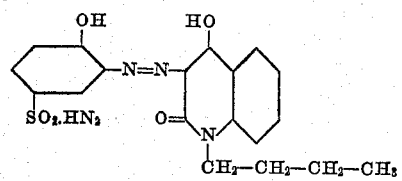

References Cited in the file of this patent

UNITED STATES PATENTS

| 1,994,116 | Straub et al. | Mar. 12, 1935 |
| 2,396,327 | Kvalnes et al. | Mar. 12, 1946 |
| 2,610,175 | Widmer et al. | Sept. 9, 1952 |
| 2,673,199 | Widmer et al. | Mar. 23, 1954 |